United States Patent [19]

Okano et al.

[11] Patent Number: 5,266,989
[45] Date of Patent: Nov. 30, 1993

[54] CAMERA WHICH CAN BE USED FOR TRIMMING SHOTS

[75] Inventors: Hiroshi Okano, Tokyo; Yoshiharu Shiokama, Kawasaki; Tsuneo Watanabe, Yokohama, all of Japan

[73] Assignee: Nikon Corporation, Tokyo, Japan

[21] Appl. No.: 768,333

[22] Filed: Sep. 30, 1991

Related U.S. Application Data

[63] Continuation of Ser. No. 663,063, Feb. 28, 1991, abandoned, which is a continuation of Ser. No. 416,502, Oct. 3, 1989, abandoned.

[30] Foreign Application Priority Data

Oct. 6, 1988 [JP] Japan .................. 63-252698
Oct. 13, 1988 [JP] Japan .................. 63-258221
Dec. 5, 1988 [JP] Japan .................. 63-307436

[51] Int. Cl.$^5$ ............................. G03B 17/24
[52] U.S. Cl. .................. 354/106; 354/195.1; 354/286
[58] Field of Search ........... 354/105, 106, 109, 195.1, 354/195.12, 400, 286

[56] References Cited

U.S. PATENT DOCUMENTS 4,774,536 9/1988 Inoue et al. .................. 354/106
5,012,268 4/1991 Hirai .......................... 354/286 X

FOREIGN PATENT DOCUMENTS 61-43698 9/1986 Japan .

Primary Examiner—Michael L. Gellner
Assistant Examiner—Howard B. Blankenship
Attorney, Agent, or Firm—Shapiro and Shapiro

[57] ABSTRACT

A camera which can be used for trimming shots and which has a lens whose optical performance can be read as optical-performance information comprises: a reader for reading the optical-performance information; an input device for inputting a trimming magnification; and a recorder for recording trimming information on a recording medium on the basis of the optical-performance information read and the trimming magnification that is set.

26 Claims, 7 Drawing Sheets

CAMERA WHICH CAN BE USED FOR TRIMMING SHOTS

This is a continuation of application Ser. NO. 663,063 filed Feb. 28, 1991, which is a continuation of application Ser. NO. 416,502 filed Oct. 3, 1989, both of which are now abandoned.

BACKGROUND OF THE INVENTION

Field of the Invention

This invention relates to a camera which is capable of recording information designating a trimming range at the time of photographing.

Related Background Art

Cameras which can be used for trimming shots are already well known (see, for example, Japanese Patent Publication No. 61-43698). In a trimming shot, information designating the trimming range is recorded at the time of photographing so that only the designated range of the image taken will be printed on photographic paper in the printing process after the development of the film. Thus, what is obtained by printing is a trimmed picture representing a part of the shot image in an enlarged form.

Generally, the optical system of a camera photographic lens is so designed that its optical performance (including, for example, the MTF (modulation transfer function) and aberration) allow a satisfactory image to be obtained uniformly over the entire area of the shot image. However, as is generally known, optimum images of a subject are formed at different positions in the direction of the optical axis for different heights of the image above the optical axis, so that the optimum image field obtained by an image-forming luminous flux around the optical axis generally differs from that obtained by a peripheral image-forming luminous flux.

When, as in a trimming shot, only a portion of an image is to be printed, image optimization presents a problem. More particularly, depending on the location of the image portion to be printed (for example, an image portion whose height Y above the optical axis is approximately 0 versus one whose height Y above the optical axis is approximately 20 mm), there may or may not be a correspondence with the optimum image portion in the overall photographic image.

In addition when printing trimming-shot images, the enlarging magnification is higher than in normal shots, where the entire shot image is printed on photographic paper. As a result, the quality of a trimming-shot image is inevitably inferior to that of a normal-shot image. Thus, a trimming shot is quite likely to fail to provide an optimum image which would surely have been obtained by a normal shot, although better optical performance of the photographic lens is desired therefor.

The problems with the relevant prior art will be further discussed. The photographic apparatus disclosed in the above-mentioned reference, Japanese Patent Publication No. 61-43698, is equipped with a finder optical system which makes it possible to set a trimming range in correspondence with the visual field of the finder. A trimming-control means which is coupled with the finder optical system drives a trimming-information recording device, thereby recording the trimming magnification corresponding to the visual field of the finder.

In the above-described prior art, the print enlarging magnification for a trimming shot is higher than that for a normal shot (the magnification corresponding to a standard print size, for example, the "service size"), so that a deterioration in the quality of the peripheral image portions that would constitute no particular problem in a normal shot may be conspicuous in a trimming shot.

The enlarging magnification designated is the same whether the trimming is to be effected in the middle of an image or in a peripheral area thereof as long as the image size is the same. This is in particular a problem where trimming is effected in a peripheral image area because a satisfactory image quality is often not obtained there. In order that a satisfactory image quality may be secured, it has been proposed that the lens aperture be controlled at the time of photographing. This, however, involves changes in the out-of-focus effect, so that the image as intended by the photographer cannot be obtained.

SUMMARY OF THE INVENTION

It is accordingly an object of this invention to provide a camera whose lens is driven and controlled in accordance with information on its optical performance and the trimming range, thereby improving the image quality of a trimming shot.

Another object of this invention is to provide a camera which is capable of determining a maximum trimming magnification which allows images of a satisfactory quality to be obtained in accordance with information on the optical performance of the lens, information on the optical sensitivity of the recording medium, and information on the photographing conditions such as the f-number.

Still another object of this invention is to provide a camera which allows the photographer to set a desired trimming magnification, which can be recorded, along with the maximum trimming magnification that allows images of a satisfactory quality to be obtained, on a recording medium (such as film) as trimming information.

A further object of this invention is to provide a printing apparatus which is adapted to read from the recording medium trimming information, which information includes the trimming magnification desired by the photographer and the maximum trimming magnification, and to perform trimming in an appropriate manner.

To obtain the optimum image in a range designated when taking a trimming shot, two methods now to be discussed may be adopted.

The first method entails moving the entire optical system in correspondence with the curvature-of-field aberration. Of course the movement of the entire photographic-lens system in the direction of the optical axis is limited to the range which can be regarded as in-focus.

FIG. 4A is an optical-performance chart showing the curvature-of-field aberration of a photographic lens at an in-focus position. It will be understood that, in the case of a normal shot, it is sufficient for the entire photographic-lens system to be moved in such a manner that the image-sensing surface (film surface) is matched with position P2 of FIG. 4A, since what is required here is that an optimum image is obtained uniformly over the entire range of the photographic image.

In the case of a trimming shot, however, only a part of the photographed image is printed in an enlarged form. Thus, when the range indicated by the arrow A or B is designated for trimming, a print of noticeably higher resolution can be obtained when the entire photographic-lens system is moved in such a manner that the image-sensing surface is matched with position P1 or P3, rather than with position P2.

The second entails changing the MTF-curve itself. This can be realized by intentionally moving a certain part of the photographic-lens system in the direction of the optical axis. FIG. 4B is an optical-performance chart showing MTF-curves C1, C2 and C3 of the photographic-lens system. In the normal shot, a part of the photographic-lens system is moved in the direction of the optical axis to make the MTF values at different heights of the image above axis approximately equal to each other so that a satisfactory image as represented by C2 of FIG. 4B may be obtained uniformly over the entire picture. Of course, this movement of a part of the photographic-lens system is limited to the range which can be regarded as in-focus.

In the trimming shot, the image is normally enlarged when printing as compared to that obtained by the normal shot, so that the MTF performance represented by curve C2 of FIG. 4B is not sufficient. When the trim range is determined as indicated by the arrow C of FIG. 4B (where the height of the image above the axis is 0 to 5 mm), an optimum image can be obtained by moving a part of the photographic-lens system in the direction of the optical axis in such a manner that the MTF is high only in this range, that is, the MTF-performance becomes as represented by curve C3. When the trim range is determined as indicated by the arrow D (where the height of the image above the axis is 15 to 20 mm), an optimum image can be obtained by moving a part of the photographic-lens system in such a manner that the MTF is high only in this range, that is, the MTF-performance becomes as represented by MTF-curve C1.

In accordance with this invention, information on the correction of the optical system of the photographic lens is compared with the trim range determined by the photographer when performing a trimming shot and the optical system is set in such a manner that the optimum optical performance can be obtained in the trim range. Accordingly, the optimum resolving power can be obtained in the trim range arbitrarily determined when performing the trimming shot, thus making it possible to minimize the deterioration in image quality due to the increase in the enlarging magnification at the time of printing.

DESCRIPTION OF THE PREFERRED EMBODIMENTS

Figure 1:
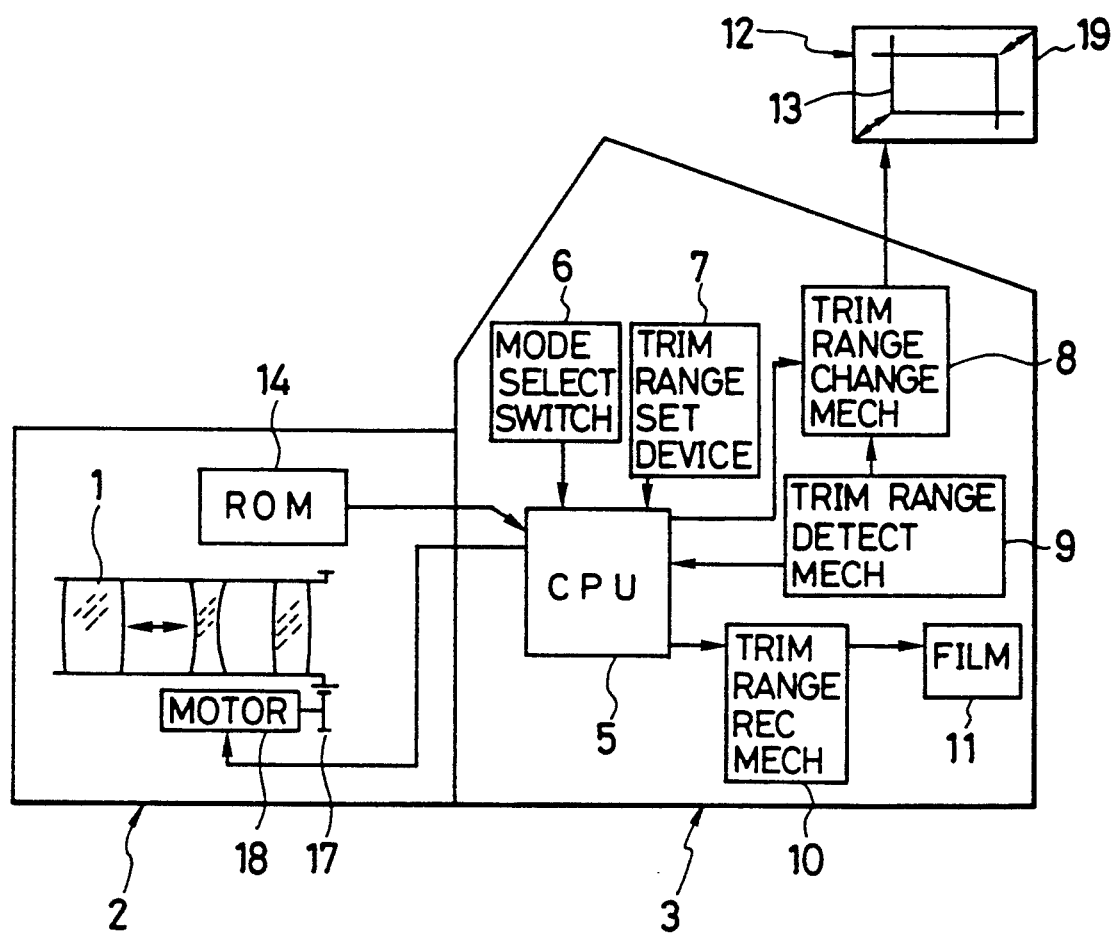
FIG. 1 is a block diagram showing a first embodiment of this invention.

FIG. 1 shows an embodiment of this invention, in which the correction of the curvature of field is effected through the trim range, thereby improving the image quality in the trim range.

Figure 2A:
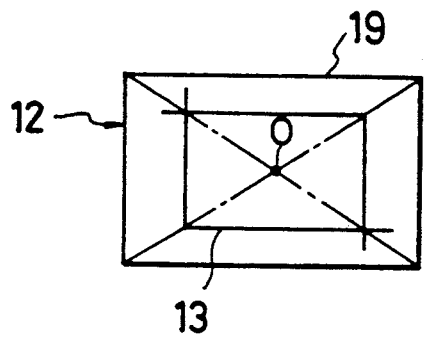
FIGS. 2A to 2C are diagrams showing trim ranges for trimming shots.

A camera body 3 which is capable of trimming as well as normal shots is equipped with a mode-select switch 6 which makes it possible to arbitrarily switch between the normal-shot mode and the trimming-shot mode, as well as a trim-range setting device 7 which can be manipulated on the outside so as to arbitrarily set the trim range. Here, a case will be considered where the center ○ of a full-size picture 19 is the same as that of a trim range 13, as shown in FIG. 2A.

The camera body 3 includes a finder 12 which can indicate the trim-range frame 13. Provided inside the camera body are a trim-range changing mechanism 8 for changing the trim-range frame 13, a trim-range detecting mechanism 9 for detecting the trim range which has been set, a trim-range recording mechanism 10 for recording information on the trim range on a film 11, and a CPU 5 for controlling the operation of these mechanisms. The trim-range changing mechanism 8, the trim-range detecting mechanism 9, the trim-range recording mechanism 10, etc. are well known in the art; they are disclosed, for example, in Japanese Patent Publication No. 61-43698, so an explanation of these mechanisms will be omitted here.

Figure 3:
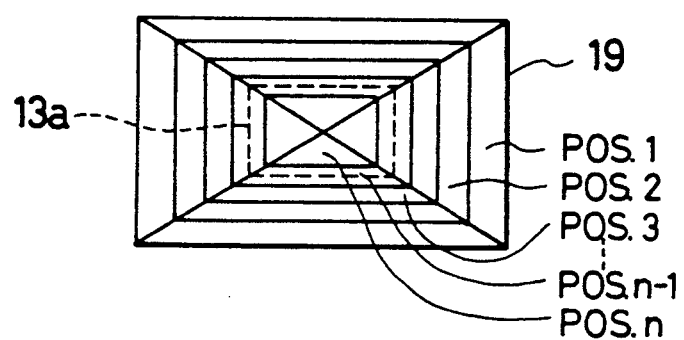
FIG. 3 is a diagram illustrating a trim-range dividing pattern in the lens ROM.
Figure 4A:
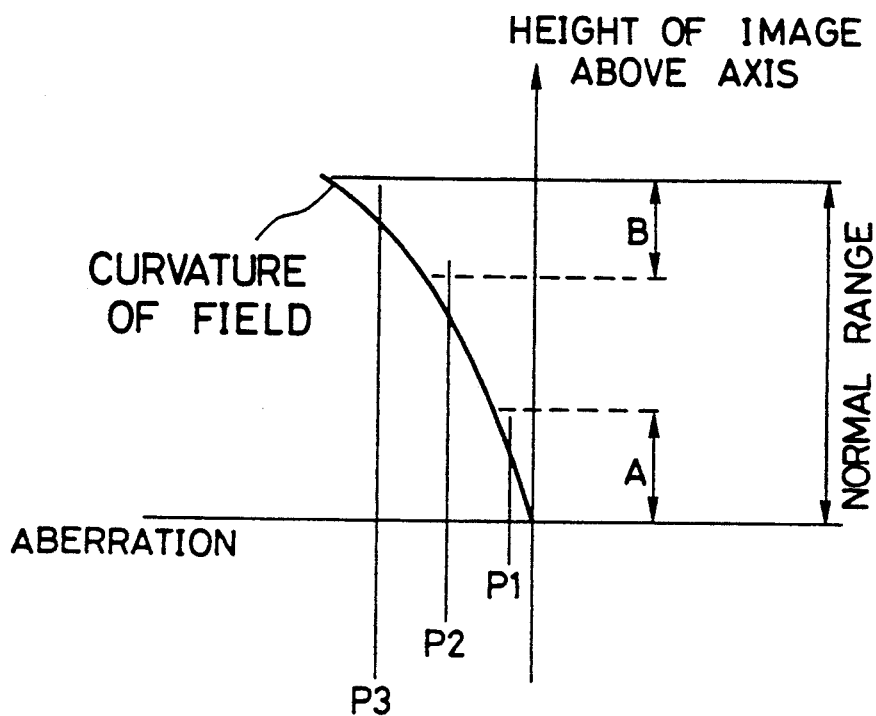
FIG. 4A is a chart illustrating the relationship between the curvature of field and the photographing range (the height of the image above the axis)
Figure 4B:
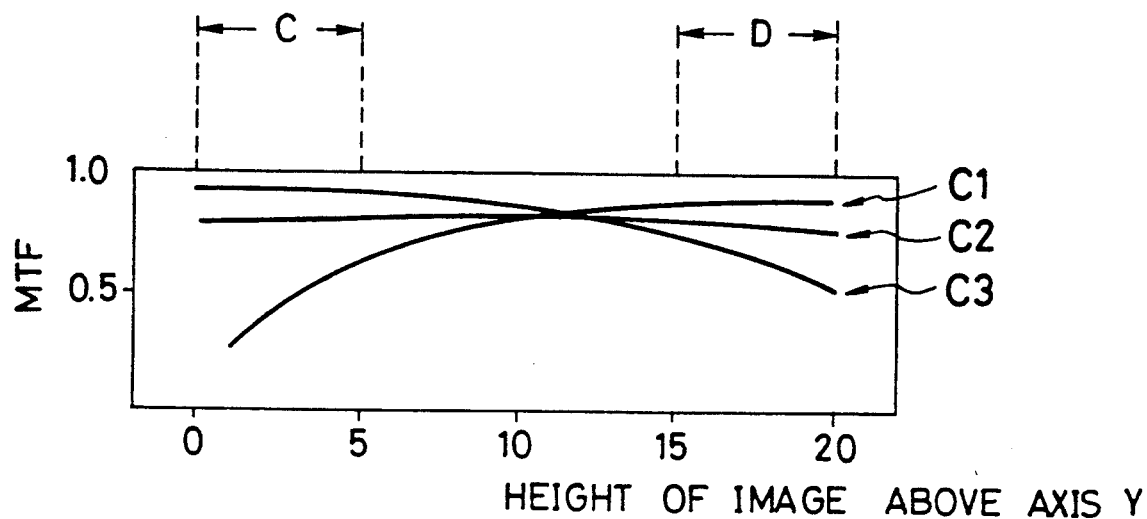
FIG. 4B is an MTF chart showing changes in the MTF when a part of the optical system is moved in the direction of the optical axis.

An interchangeable-lens barrel 2 is equipped with a photographic-lens system 1, an optical-system driving motor 18 adapted to drive the photographic-lens system 1 in accordance with control signals from the CPU 5, and an ROM 14. The ROM 14 stores an optimum aberration-correction amount for each of a plurality of trim ranges defined, as shown in FIG. 3, in an expanding manner (in grades) from a smallest possible quadrilateral to a full-size picture. When the interchangeable lens 2 is attached to the camera body 3, a mutual communication becomes possible between the CPU 5, controlling the camera operation, and the ROM 14 provided in the interchangeable lens 2.

The operation of this embodiment will now be described. The photographer selects the trimming-shot mode with the mode-select switch 6. Then, a desired trim range is set by means of the trim-range setting device 7 while watching the picture frame 13 displayed on the finder 12 to indicate the trim range which is being selected. The picture frame 13 is moved by a trim-range changing mechanism 8 in such a manner as to indicate a trim range which corresponds to the command input through the trim-range setting device 7.

When the trim range has been determined, the positional information on the range to be trimmed is transmitted to the CPU 5 by means of the trim-range detecting mechanism 9. The trim ranges and the aberration-correction amount providing an optimum curvature of field for each trim range are stored in order by trim range size (pos. 1 . . . n) in the ROM 14 provided in the lens; From the lens ROM data, the CPU 5 in the body selects, on the basis of the positional information on the set trim range detected by the trim-range detecting mechanism 9, the data block of the aberration-correction amount for the trim range that is closest to the set trim range. In FIG. 3, for example, the actually set trim range 13a, which is indicated by the broken line, is represented by the trim range of pos. n-1. Thus, the lens ROM data selected is the data block of the curvature-of-field-correction amount which provides the optimum resolving power in this trimming-shot range.

When performing a trimming shot, the entire lens system 1 is automatically driven in the direction of the optical axis by the motor 18, not in accordance with the aberration-correction amount set for a normal shot, but in conformity with the aberration correction amount newly obtained as described above to match the set trim range.

Simultaneously with the photographing, the information on the trim range selected by the photographer is recorded on the film 11 by the recording mechanism 10.

Embodiment 2

Figure 5:
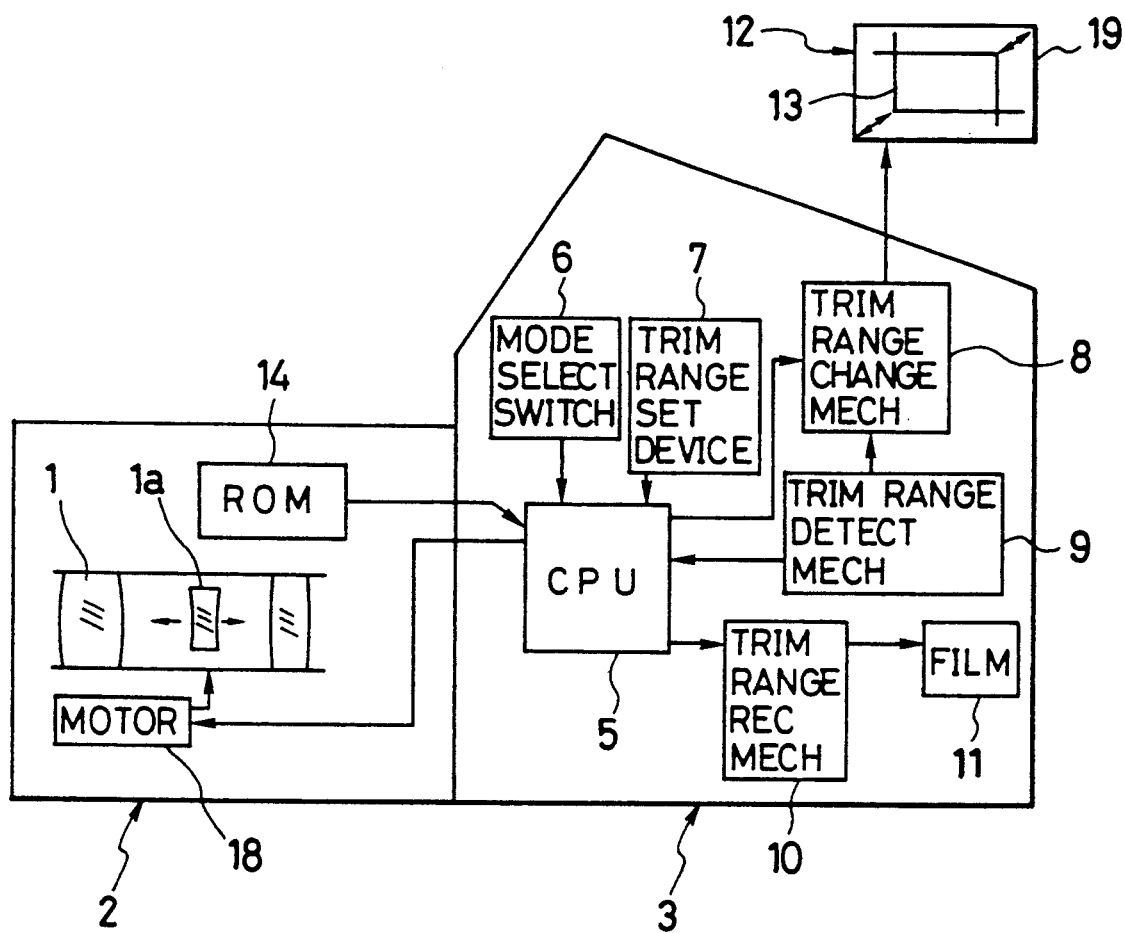
FIG. 5 is a block diagram showing a second embodiment of this invention.

FIG. 5 shows a second embodiment of this invention. This is a method of setting the optical system in such a manner that an optimum MTF is obtained for the trim range.

The basic construction of this embodiment is the same as that of the embodiment shown in FIG. 1, so the same reference numerals are employed here. In the second embodiment, the interchangeable lens 2 contains a motor 18 adapted to drive a certain part 1a of the photographic-lens system 1 in the direction of the optical axis. This motor 18 is controlled by the CPU 5 in the camera body 3.

Next, the operation of this embodiment will be described.

When the trimming-shot mode has been selected and the range 13 for trimming has been determined, the positional information on the trim range is detected by the trim-range detecting mechanism 9 and is transmitted to the CPU 5. The ROM 14 in the lens stores, as in the first embodiment, trim ranges which are defined in an expanding fashion, as shown in FIG. 3, as well as position-setting data for the optical system part 1a which provides an optimum MTF exclusively for each of the trim ranges. The ROM 14 transmits these data to the CPU 5 in the body. Of course, the arrangement is such that, at least in the range where focus detection is performed (which is normally around the optical axis), an image which allows focus detection can be obtained. The CPU 5 selects from the ROM data the MTF-data block for the trim range which is closest to the set trim range, and determines the amount of movement of the optical system part 1a required for obtaining an optimum image in the set trim range.

On the basis of the results obtained through the above operations, the part 1a of the photographic lens 1 is automatically driven by the motor 18 provided in the lens. In this way, the optical system is set in such a manner that an optimum resolving power is obtained in the range for trimming, and the camera becomes ready for photographing.

In the above embodiments, the invention is applied to camera systems whose photographic lenses are interchangeable. However, the application of this invention is not limited to such cases. It can be applied, for example, to a camera having an integrally formed photographic lens, as in a compact camera, and the construction and operation of such a system are basically the same as above.

As for the trim-range setting, the above-described method in which the trim range is narrowed down toward the center of a full-size picture frame (the center of the full-size picture frame is the same as that of the trim range) is mechanically simple and is generally preferred. However, the principles of the invention are equally applicable to a system in which an arbitrary portion of a full-size picture for a normal shot is set as the trim range, as shown in FIG. 2B, or to a system in which the trim range is selected from among several preset trim ranges, as shown in FIG. 2C.

Figure 2B:
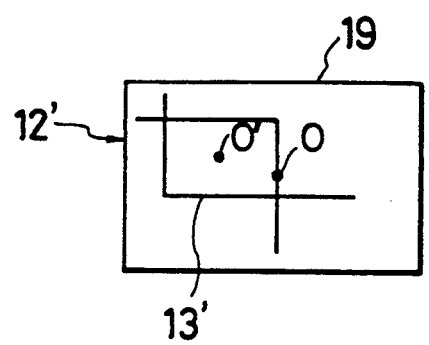
Figure 2C:
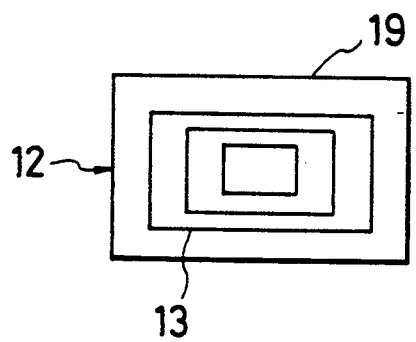

When the trim range is set in an arbitrary position as shown in FIG. 2B, a larger memory capacity will be required of the lens ROM, and the CPU 5 will take a longer time in computing. In contrast, when the trim ranges are restricted to several preset patterns as shown in FIG. 2C, the correction amount for the curvature-of-field aberration (in the first embodiment) or the amount of movement of the optical system part 1a for improving the in-trim-range MTF (in the second embodiment) can be stored as data for each of these several patterns in the ROM 14. This helps to reduce the computation time for the CPU 5 and makes it possible to omit the trim-range detect mechanism 9 and to use the trim-range setting device 7 only, thereby substantially reducing the time lag before photographing.

While in the above embodiments the curvature-of-field aberration is corrected at the time of photographing in the trimming mode, this invention is not limited to this manner of correction. The photographic lens 1 may, for example, be driven in accordance with an aberration-correction amount in which other types of aberration are taken into account along with the curvature of field.

As will be appreciated from the preceding description, in accordance with this invention, an optical system is set to provide an optimum resolution in the range for trimming when taking a trimming shot, so that, as compared to an image taken by an optical system which is set for a normal shot only, the image quality can be improved as far as the trim range is concerned. Further, the deterioration in image quality due to the increase of the enlarging magnification at the time of printing, as has been characteristic of prior systems, can be precluded.

Figure 8:
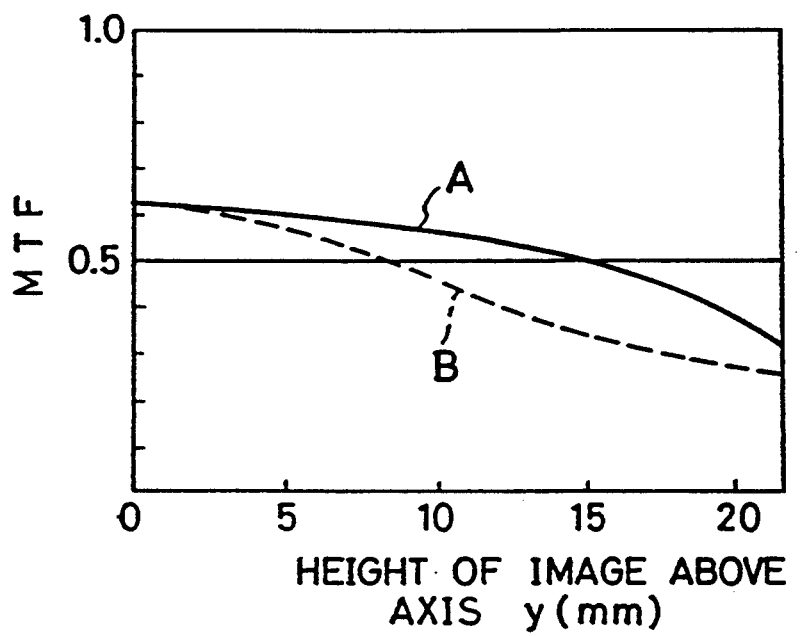
FIG. 8 is an MTF chart of an optical system.

FIG. 8 shows MTF-curves indicative of lens optical properties. The lines A and B represent two different types of lenses, respectively. The vertical axis indicates the MTF (modulation transfer function), and the horizontal axis indicates the height of the image above the axis. Generally, the quality of an image obtained by a lens is, as will be appreciated from in FIG. 8, inferior the peripheral portions of the image relative to the portion in the central section of the same, which corresponds to the optical axis. This is attributable to the fact that lenses are designed attaching greater importance to the image quality in the central section of the image since the main subject is generally framed in the middle of the picture.

Figure 9:
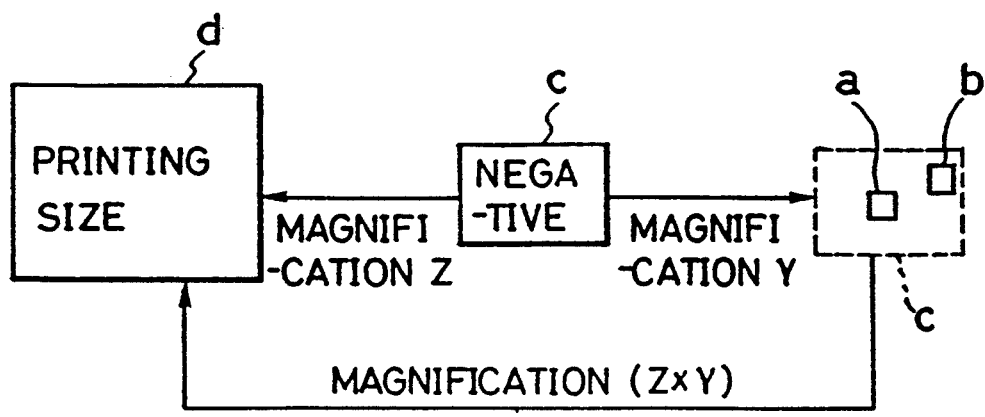
FIG. 9 is a diagram illustrating the enlarging amount.

Referring additionally to FIG. 9, it will be appreciated that there is a distinct difference in image quality between the case where the trim range is positioned between the image center and the height of say 10 mm above the axis, as the trim range (a), and the case where the trim range is positioned between the heights of say 10 mm and 20 mm above the axis, as the trim range (b) (the trim ranges being assumed to be of equal size). This difference is not so conspicuous when the enlarging magnification (Z) (the magnification for enlarging the negative c to the print size d) at the time of printing remains relatively small. However, as the magnification (Z) becomes larger, the difference becomes evident. Thus, when trimming a peripheral image portion, an upper limit must be established to the enlarging magnification (Z×Y) so that a satisfactory image quality can be secured.

Also in the case where the trim range is narrowed down toward the center of the picture (the trimming magnification (Y) is increased), the upper limit of the enlarging magnification (Z×Y) for printing and the MTF (contrast information) of the lens are correlated with each other.

Referring again to FIG. 8, the lens B indicated by the broken line exhibits a more rapid fall of the MTF value than the lens A indicated by the solid line. Assuming that the trim range is set up to a height of 10 mm or so above the axis, the representation of the peripheral image obtained by the lens B will be inferior to that obtained by the lens A.

If pictures of an equivalent image quality are to be obtained by these lenses, the enlarging magnification for printing must be set lower for the lens B.

If the same lens is used, the MTF is different for different aperture values and different object distances, the MTF value being better when the aperture is stopped down than when left open. By ascertaining the MTF values under different aperture values and object distances, the upper limit of the enlarging magnification can be set more precisely.

Of course, the final enlarging magnification may be determined in accordance with the information on aberration instead of the MTF value.

Apart from optical performance parameters related to aberration of which the MTF is typical, the image quality is influenced by the following two factors:

(1) FACTORS RELATED TO FOCUSING

For example, the depth of field is determined by the focal length, the object distance, and the set aperture value. When photographing with a small depth, a more accurate focusing is required. Since the enlarging magnification is relatively high when photographing in the trimming mode, any errors in focusing will appear more conspicuously at the time of printing.

(2) FILM SENSITIVITY

As the sensitivity becomes higher, the granularity becomes more coarse. Assuming trimming is performed under the same conditions, a better image quality is obtained when a film of a lower sensitivity is used.

Embodiment 3

Figure 6:
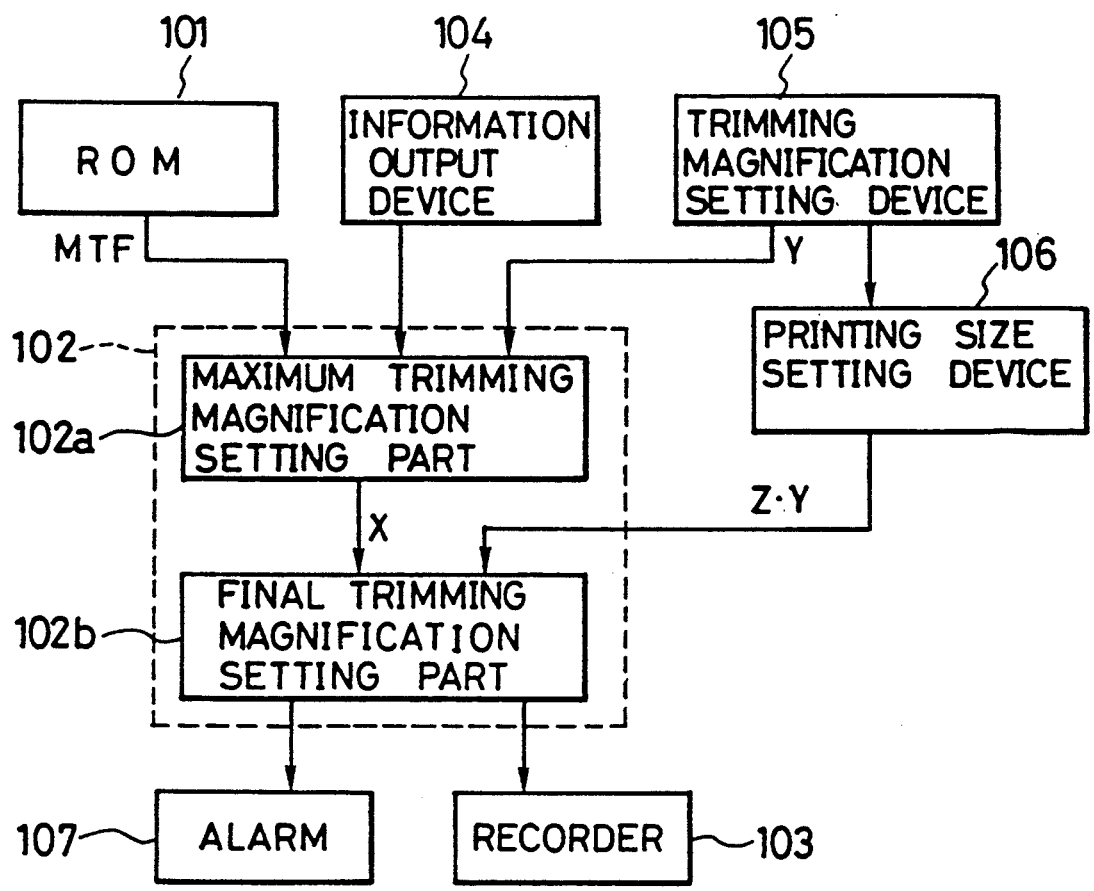
FIG. 6 is a block diagram showing a third embodiment of this invention.

FIG. 6 shows a third embodiment of this invention. A ROM 101 stores the lens MTF information (including information on aberrations). A magnification controller 102 is composed of a maximum-trimming-magnification setting part 102a and a final-trimming-magnification setting part 102b, which serve to control the enlarging magnification. In the case of an interchangeable-lens camera, the ROM 101 is arranged in the interchangeable lens and stores the MTF information and the focal-length information which are peculiar to that lens, as well as the lens information used for automatic focusing control. In the case of a lens-shutter-type camera, the ROM 101 may be arranged in the camera body since in that case no interchange of photographic lenses is performed. The MTF information transmitted from the ROM 101 is input to the magnification controller 102. Photographing information including the film sensitivity (ISO) and the set aperture value (f-number) is input from an information output device 104 to the magnification controller 102. Further, other factors influencing the image quality are input thereto from different determining devices in the camera body.

A trimming-magnification setting device 105 includes an external operating member arranged on the camera body so as to enable the photographer to arbitrarily set the trimming magnification (Y), and information indicative of the trimming magnification is input to the magnification controller 102 and to a printing-size setting device 106.

The printing-size setting device 106 includes an external operating member arranged on the camera body so as to enable the photographer to arbitrarily set a desired printing size. Information indicative of the enlarging magnification (Z×Y) showing the print size is input to the magnification controller 102 on the basis of the information from the trimming-magnification setting device 105.

The maximum-trimming-magnification setting part 102a of the magnification controller 102 determines the maximum enlarging magnification (X) which satisfies a standard image quality which is previously established on the basis of the input MTF information, the film sensitivity, the f-number, and the trimming-magnification information.

When the trimming magnification (Y) and the print size have been set in the camera, the enlarging magnification (Z×Y) is determined on the basis of the picture proportion.

The controller 102 compares the enlarging magnification (Z×Y) which is determined here with the maximum enlarging magnification (X). When the maximum enlarging magnification (X) is higher than the enlarging magnification (Z×Y), the enlarging magnification (Z×Y) corresponding to the print size set by the photographer is transmitted as the information on the final enlarging magnification to a recorder 103, which records this information on a film by an optical method. When the maximum enlarging magnification (X) is lower than the enlarging magnification (Z×Y), a satisfactory image quality cannot be obtained, so that an alarm 107 controls the camera body such that no exposure operation can be performed. The alarm 107 may warn the photographer through a signal sound or the like. Along with the warning thus given by the alarm 107, the maximum enlarging magnification at that time may be displayed. Instead of using the above-mentioned optical method, the recorder 103 may record the information electrically on an EPROM or the like provided on the film cartridge, or magnetically on a magnetic tape or the like.

The information recorded by recorder 103 is utilized when the used film is developed in the photofinishing laboratory, and is printed in a form enlarged with the optimum enlarging magnification.

It is also possible, even with a magnification below the maximum enlarging magnification, to rank the different image qualities obtained through the enlarging magnifications of the print and to inform the photographer of this ranking. For example, if the picture which is being taken is to be printed in the service size, it may be displayed to the photographer as "Rank A", and, if it is to be printed in the cabinet size or in the 10×12 inch size, as "Rank A" or "Rank B".

Embodiment 4

Figure 7:
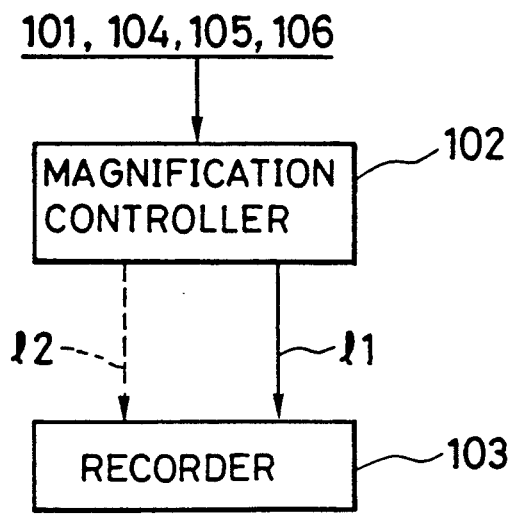
FIG. 7 is a block diagram showing a trimming camera in accordance with a fourth embodiment of this invention.

FIG. 7 shows a fourth embodiment of this invention. The construction of the fourth embodiment is substantially the same as the third, the only difference lying in the construction of the magnification controller 102 and of the recorder 103. In the following, this difference will be described.

The controller 102 compares the enlarging magnification (Z×Y) determined by the printing-size setting device 106 with the maximum enlarging magnification (X). When the maximum enlarging magnification (X) is higher than the enlarging magnification (Z×Y), the enlarging magnification (Z×Y) corresponding to the print size set by the photographer is transmitted as the final enlarging-magnification information to the recorder 103 through a signal line 11. The recorder 103 then records the information on the film. The maximum enlarging magnification (X) is also recorded through the signal line 12 as auxiliary information. When the maximum enlarging magnification is lower than the enlarging magnification (Z×Y), a satisfactory image quality cannot be obtained, so that, in this case, the maximum enlarging magnification (X) is transmitted as the final enlarging-magnification information through the signal line 11 to the recorder 103, which records this information on the film. Further, the enlarging magnification (Z×Y) is also recorded through the signal line 12 as auxiliary information. In this case, the print size obtained in the photofinishing laboratory is naturally smaller when enlarged with the maximum enlarging magnification.

The enlarging magnification is thus recorded by the recorder 103, is transferred to the photofinishing laboratory along with the film used. In the photofinishing laboratory, magnification is determined on the basis of the record from the recorder 103 when developing the used film, and printing is performed.

While in this embodiment, the ROM 101 and the controller 102 are separate components, they may be replaced by a single CPU. Further, by providing in the lens barrel or the camera body an encoder for reading the position of the in-focus lens, the object distance can be judged. This arrangement makes it possible to read MTF information for each object distance, so that the maximum enlarging magnification can be determined more precisely. In a camera equipped with a zoom lens, an encoder for reading the position of the zoom-lens system may be further provided, thereby making it possible to judge the object distance. The MTF for the respective focal lengths and object distances can then be transmitted to the controller 102.

Embodiment 5

Figure 10:
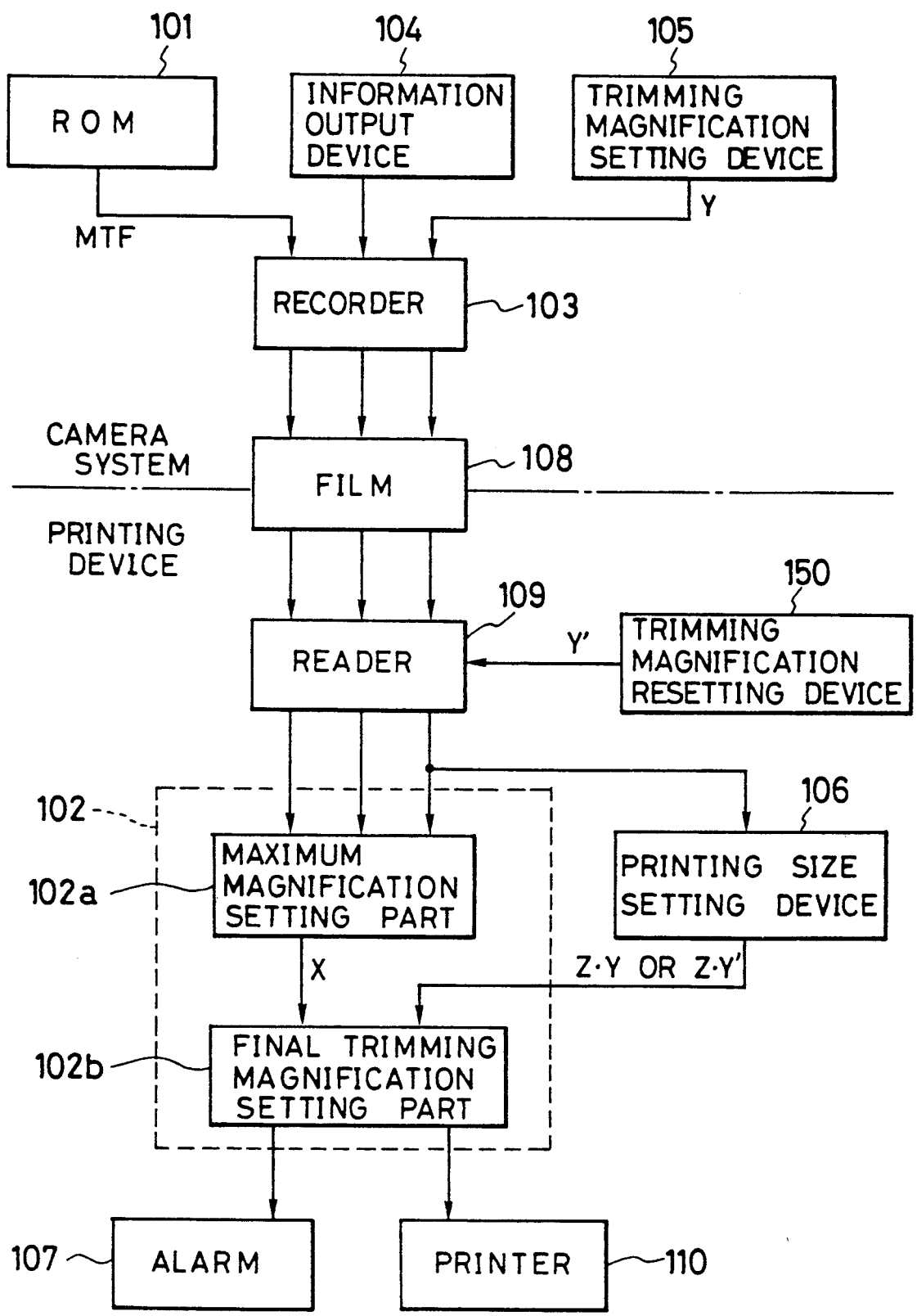
FIG. 10 is a block diagram showing a printing apparatus constituting a fifth embodiment of this invention.

FIG. 10 shows a fifth embodiment of this invention including a printing apparatus in accordance with this invention. Those components referred to by the same reference numerals as in the third and fourth embodiments have the same construction as the components previously described, so a description of them will be omitted.

A camera system (consisting of a camera body and a lens barrel) which can be used for trimming shots is equipped with an ROM 101 storing MTF information, an information-output device 104 adapted to output information on film sensitivity and aperture values, and a trimming-magnification setting device 105 which allows a desired trimming magnification to be set through external operation. The data from the ROM 101, the information-output device 104 and the trimming-magnification setting device 105 are, as described earlier, recorded by the recorder 103 on the film or on an EPROM on the film cartridge. It is also possible, as in the embodiment shown in FIG. 7, to further provide in the camera system a printing-size setting device 106 and a magnification controller 102. In that case, the information recorded will include an enlargement magnification corresponding to the print size set by the photographer and the maximum enlarging magnification as the main or auxiliary information.

In the printing apparatus, a reader 109 reads out, in the process of developing the film 108, information recorded on the film 108 or the film cartridge. The data read by the reader 109 is input to the magnification controller 102. A display device (not shown) displays the data, distinguishing between the main information and the auxiliary information. Unless the developer particularly wishes otherwise, the main information is recognized as the trimming magnification Y.

The printing apparatus is further equipped with a trimming-magnification resetting device 150, which makes it possible to change the trimming magnification set by the trimming camera when printing. The trimming magnification is usually set by the trimming camera when photographing. However, when, for example, it is desired that the trimming magnification be reset after photographing, resetting can be effected when printing by the trimming-magnification resetting device 150.

The magnification controller 102 is composed of a maximum-enlarging-magnification setting part 102a and a final-enlarging-magnification setting part 102b, and serves to determine the final enlarging magnification.

If the trimming magnification Y recorded in recorder 103 and the trimming magnification Y' of the trimming-magnification resetting device 150 are simultaneously input to the reader 109, the reset trimming magnification Y' is adopted. The maximum-trimming-magnification setting part 102a determines, in the same manner as described above, the maximum enlarging magnification X from other data recorded in the recorder 103 (i.e., data other than the trimming magnification Y not used) and the trimming magnification Y'. If the trimming magnification Y' is not reset by the trimming-magnification resetting device 150, the maximum-enlarging-magnification setting part 102a naturally determines the maximum enlarging magnification X from the data recorded in the recorder 103, including the magnification Y.

Further, either the trimming magnification Y or the trimming magnification Y' is input from the reader 109 to the printing-size setting device 106. When a desired print size is set by the user, the printing-size setting device 106 sets the enlarging-magnification information (Z×Y or Z×Y') on the basis of the input trimming magnification Y or Y'. This information is input to the final-trimming-magnification setting part 102b.

The final-trimming-magnification setting part 102b compares the enlarging magnification X determined by the maximum-enlarging-magnification setting part 102a with the enlarging magnification (Z×Y or Z×Y') set by the printing-size setting device 106. When the maximum enlarging magnification X is higher than the enlarging magnification (Z×Y or Z×Y'), the enlarging magnification corresponding to the set printing size is determined to be the final enlarging magnification, as in the above-described embodiment. In the converse case, the maximum enlarging magnification is determined to be the final enlarging magnification.

On the basis of the final enlarging magnification determined by the magnification controller 102, the enlargement of the print is performed. When the final enlarging magnification is lower than the enlarging magnification set by the printing-magnification setting device 106, a satisfactory image quality cannot be obtained, so that the alarm 107 gives a warning through sound, light, etc.

Thus, in the fifth embodiment, the magnification controller 102 is arranged on the side of the printing apparatus, so that, even if the trimming magnification is changed after photographing, the image quality can be ascertained before printing, thus making it possible to reduce the possibility of prints of an undesirable quality.

What is claimed is:

1. A camera capable of designating trim ranges, comprising:
    a phototaking optical system for forming a subject image on a recording medium,
    storage means storing information corresponding to optical performance characteristics of said phototaking optical system for different trim ranges,
    trim-range setting means for setting a trim range of said subject image,
    reading means for reading the information corresponding to the set trim range from said storage means, and
    control means for determining a position along an optical axis of said phototaking optical system in accordance with the information read by said reading means.

2. A camera as claimed in claim 1, wherein said position corresponds to a position of said phototaking optical system at which a portion of said subject image corresponding to the set trim range is optimized on said recording medium.

3. A camera as claimed in claim 2, further including means for moving said phototaking optical system to the position determined by said control means.

4. A camera as claimed in claim 3, wherein said control means generates a driving-signal output in accordance with the information read by said reading means, and said moving means moves said phototaking optical system in response to said driving-signal output.

5. A camera as claimed in claim 3, wherein the information stored in said storing means comprises curvature-of-field aberration correction information.

6. A camera as claimed in claim 1, wherein said position corresponds to a position of part of said phototaking optical system at which a portion of said subject image corresponding to the set trim range is optimized on said recording medium.

7. A camera as claimed in claim 6, further including means for moving said part of said phototaking optical system to the position determined by said control means.

8. A camera as claimed in claim 7, wherein said control means generates a driving-signal output in accordance with the information read by said reading means, and said moving means moves said part of said phototaking optical system in response to said driving-signal output.

9. A camera as claimed in claim 8, wherein said information comprises modulation transfer function correction information.

10. A camera as claimed in claim 1, wherein said information comprises aberration-related information.

11. A camera as claimed in claim 1, further including means for moving at least part of said phototaking optical system in accordance with the position determined by said control means.

12. A camera as claimed in claim 1, further including means for recording information concerning the set trim range on one of said recording medium or a recording device associated with said recording medium.

13. A camera capable of designating trim ranges, comprising:
    a phototaking optical system for forming a subject image on a recording medium,
    means for setting a trimming magnification,
    means for supplying photographic data including an aperture value of said phototaking optical system selected from a plurality of selectable aperture values,
    storage means storing information corresponding to optical performance characteristics of said phototaking optical system for said plurality of aperture values at different trimming magnifications, and
    enlarging-magnification determining means for determining an enlarging magnification for preparing a print of a portion of said subject image based on said photographic data including the aperture value and the corresponding optical performance characteristic information stored in said storage means.

14. A camera as claimed in claim 13, wherein said enlarging-magnification determining means determines a maximum enlarging magnification for appropriate image quality of said print.

15. A camera as claimed in claim 14, further comprising means for setting the size of said print and means for setting an enlarging magnification based on the set trimming magnification and the set size of said print, said enlarging-magnification determining means determining a final enlarging magnification by comparing said maximum enlarging magnification with the set enlarging magnification.

16. A camera as claimed in claim 13, further comprising means for recording data concerning said final enlarging magnification on one of said recording medium or a recording device associated therewith.

17. A camera as claimed in claim 15, further comprising alarming means for alarming when the maximum enlarging magnification is less than the set enlarging magnification.

18. A camera to which a phototaking optical system is attachable, and capable of designating trim ranges, comprising:
    trim-range setting means for setting a trim range of a phototaking image plane,
    reading means for reading information corresponding to the set trim range from storage means, said storage means storing information corresponding to optical performance characteristics of said phototaking optical system for different trim ranges, and
    control means for determining a position along an optical axis of said phototaking optical system in accordance with the information read by said reading means.

19. A camera as claimed in claim 18, further including trim range changing means for providing a trim range indication within a finder in accordance with the information corresponding to the trim-range set by said trim-range setting means.

20. A camera as claimed in claim 18, further including recording means for recording the information corresponding to the trim range set by said trim-range setting means on an image recording medium or a recording device associated with an image recording medium.

21. A camera to which a phototaking optical system is attachable, and capable of designating trim ranges, comprising:

means for setting a trimming magnification, means for reading photographic data including at least an aperture value selected from a plurality of selectable aperture values of said phototaking optical system, and enlarging-magnification determining means for determining an enlarging magnification for preparing a print of a portion of a subject image formed by said phototaking optical system, based on the trimming magnification and the photographic data including the aperture value, and on corresponding optical performance characteristic information selected from a store of information corresponding to optical performance characteristics of said phototaking optical system for said plurality of aperture values at different trimming magnifications.

22. A camera as claimed in claim 21, wherein said enlarging-magnification determining means determines a maximum enlarging magnification for appropriate image quality of said print.

23. A camera as claimed in claim 22, further comprising means for setting the size of said print, and means for setting an enlarging magnification based on the set trimming magnification and the set size of said print, said enlarging-magnification determining means determining a final enlarging magnification by comparing said maximum enlarging magnification with the set enlarging magnification.

24. A camera as claimed in claim 23, further including recording means for recording the final enlarging magnification on an image recording medium or a recording device associated with an image recording medium.

25. A camera as claimed in claim 24, wherein the recording means records information corresponding to the size of said print.

26. A camera as claimed in claim 23, further including means for comparing the maximum enlarging magnification with the set enlarging magnification and for alarming when the maximum enlarging magnification is less than the set enlarging magnification.

* * * * *